W. A. SCHULER.
FASTENER.
APPLICATION FILED NOV. 3, 1919.

1,348,666.

Patented Aug. 3, 1920.

Inventor
W. A. Schuler by his Atty T. F. Bourne

UNITED STATES PATENT OFFICE.

WILLIAM A. SCHULER, OF NEW YORK, N. Y.

FASTENER.

1,348,666.  Specification of Letters Patent.  Patented Aug. 3, 1920.

Application filed November 3, 1919. Serial No. 335,283.

*To all whom it may concern:*

Be it known that I, WILLIAM A. SCHULER, a citizen of the United States, and resident of New York city, borough of Manhattan, in the county of New York and State of New York, have invented certain new and useful Improvements in Fasteners, of which the following is a specification.

My invention relates to improvements in locks or fasteners composed of two complementary members, one adapted to receive the other, one of said members being provided with means for gripping the other so as to lock or fasten the two members together, the locking member resembling in a general way the structure disclosed in Letters Patent No. 700,412 to M. H. Fischer of May 28, 1902 and Letters Patent granted to me Sept. 9, 1919, No. 1,315,528. In my aforesaid Letters Patent I have provided means to safeguard a clutch against accidental release of the complementary parts.

The object of my invention is to improve the construction of such locks or fasteners in such a manner as to simplify the construction and mode of operation of the parts and afford protection against accidental separation of the complementary members, while also affording a particular feature of improvement in the way in which the complementary members may be used as fasteners for coats, furs or wearing apparel as well as for key ring fasteners and other purposes.

My invention comprises novel details of improvement that will be more fully set forth hereinafter and then pointed out in the claims.

Reference is had to the accompanying drawings forming a part hereof, wherein.

Figure 1:
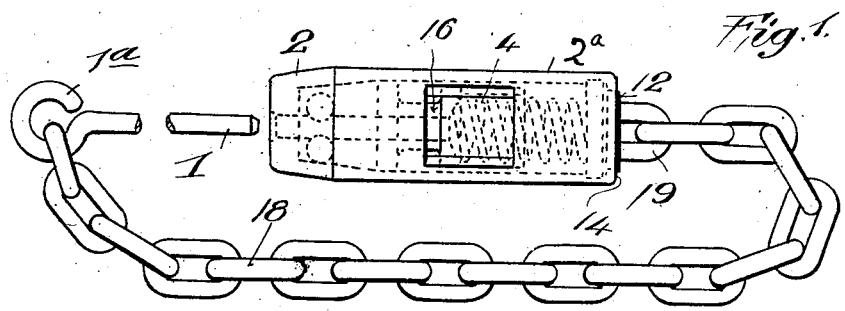
Figure 1 is a perspective view of my improved lock or fastener, shown adapted for use in conjunction with a chain for use as a flexible key ring.
Figure 2:
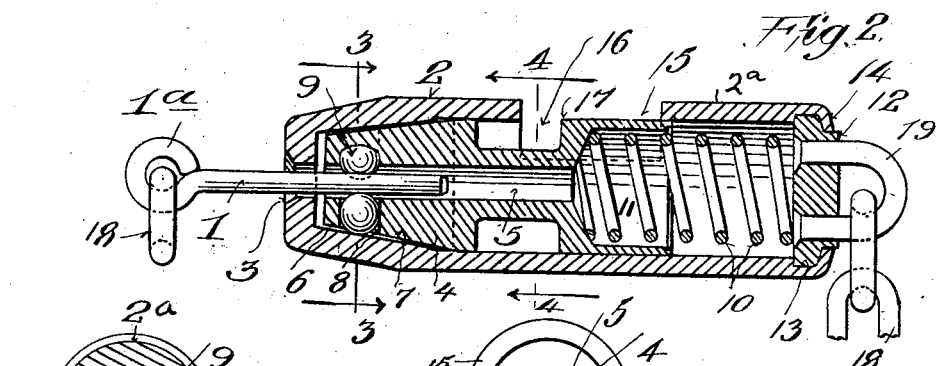
Fig. 2 is an enlarged central sectional view of the lock or fastener.
Figures 3, 4:
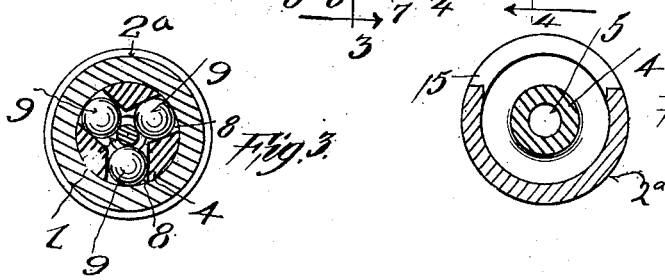

Figs. 3 and 4 are sections on the lines 3—3 and 4—4 respectively of Fig. 2;

The figures of the drawing are shown on an enlarged scale, Fig. 1 as for a key ring, for the purpose of clearness of illustration.

Similar numerals of reference indicate corresponding parts in the several views.

The numerals 1 and 2 indicate the main complementary members of the lock or fastener. Included within the shell $2^a$ are a plurality of operating parts 4, 9 and 10 which are instrumental in gripping member 1. The shell $2^a$ is shown provided with an aperture 3 at one end, to receive member 1, and with spring-pressed carrier 4 slidable within a bore in shell $2^a$, the carrier 4 having a longitudinal bore 5 to receive member 1. The surface of the bore of shell $2^a$ is tapered, as shown at 6, at the end adjacent to aperture 3. The carrier 4 has one or more transverse holes 8, in the tapered end 7 to receive a corresponding number of balls 9 whereby member 1 will be gripped in a well known manner. An actuating spring 10 is provided to press the carrier 4 toward that end of shell $2^a$ provided with aperture 3 thus forcing the ball or balls 9 toward the center of bore 5 in carrier 4. For convenience carrier 4 is provided at one end with a recess 11 to support one end of spring 10. Shell $2^a$ is closed at the end opposite aperture 3 in any known convenient manner, preferably by a cap 12, in recess 13, which is secured in position, preferably, by pressing or staking the end of shell $2^a$, as shown at 14. Cap 12 thus provides a stop for spring 10 and secures the operating parts within shell $2^a$ (Fig. 2). The carrier 4 is shown entirely retained within shell $2^a$ between the end of the tapered bore and cap 12 so that said carrier is not exposed at the end of shell $2^a$ whereby the latter protects said carrier from accidental movement to release member 1.

In order to permit the desired operation of carrier 4 to permit release of member 1, I provide shell $2^a$ with an opening 15 in a suitable position to allow the entrance of the finger nail of the user, or of any suitable implement to actuate carrier 4. I have shown the carrier provided with a peripheral recess 16 which is in a position to receive said finger nail or implement through opening 15 to enable the adjacent edge portion 17 of the carrier to be engaged to push the carrier, within shell $2^a$, against the tension of spring 10.

When member 1 is inserted within member 2 the carrier 4 will push the ball or balls to grip member 1 against shell $2^a$ in a well known manner, and the members 1 and 2 will remain wedged or locked together for use without danger of the carrier being displaced by undesired external causes since the carrier is entirely protected within shell $2^a$. When it is desired to separate members 1 and 2 it is merely necessary to insert the finger nail or an implement through opening 15 of shell 2ᵃ to engage the edge portion 17 of the carrier to enable the latter to be pushed back to release the ball or balls from gripping member 1, whereby the latter may be pulled out of member 2. By preference the recess 16 extends entirely around the carrier 4 providing an annular edge portion 17 to at all times at some part be present in operative position with respect to opening 15. The connection is shown in the form of a chain 18 attached at one end to an eye 1ᵃ at one end of member 1, and in Figs. 1 and 2 the cap 12 is shown provided with a loop 19 secured thereto, as by riveting the ends of the loop, whereby the opposite end of the chain is attached directly to the end of member 2 opposite aperture 3. The members 1 and 2 thus are connected together along the chain in a continuous manner in the direction of the axis of the members. However, the chain may be attached to members 1 and 2 in any other desired or convenient manner.

While my improved fastener may be used for any desired purpose to which this general class of fasteners is appropriated I have illustrated in Fig. 1 my improvement as applied to a flexible connection, such as a key ring, in which the danger or possibility of the complementary members becoming disassociated or detached when in service or carried in the pocket is avoided. While my improvement as illustrated in Fig. 2 is not shown attached to a fur piece or wearing apparel, it is intended that link 18 connected to complementary member 1 may be fastened to one side or portion of a fur or suitable wearing apparel and the link 18 of complementary member 2 fastened to another or component portion of the fur or wearing apparel whereby the two portions or parts of such apparel may be brought together and held securely without danger of the fastener becoming released accidentally.

Having thus described my invention, what I claim and desire to secure by Letters Patent is:—

1. A fastener, comprising a pair of members, one of which is an apertured shell to receive the other member, said shell having a lateral opening, and a spring-pressed endwise-movable clutch carrier, wholly inclosed within the shell and laterally indented to provide means lying opposite to the lateral opening in the shell through which said means may be engaged to release the clutch.

2. A fastener, comprising an apertured shell to receive a member to be clutched thereto, said shell having an inner tapered section and a lateral opening in the wall of the shell, and a yielding clutch carrier wholly inclosed within said shell and of smaller diameter than the latter with no part thereof projecting outside the wall of the shell, said carrier also having a tapering section adjoining the tapered section of the shell and having an indented portion opposite the lateral opening in the shell to allow access to the carrier to release the clutch.

3. In a clutch device, the combination with a casing having a bore provided with an interiorly-inclined face, said casing having a lateral opening, of a carrier movable longitudinally and fitting closely within said bore and inclosed wholly therein, the carrier having engageable means wholly within the bore, a grip device in the carrier coöperative with said inclined face, said carrier being movable opposite said opening to enable access to the said engageable means through the opening for shifting the carrier to disengage the clutch.

4. A fastener comprising a pair of members, one of which is a shell having a bore and being apertured at one end to receive the other member, said shell having a lateral opening and having an interiorly inclined face, a carrier movable longitudinally and fitting closely within the bore of the shell, said carrier having a recess in one end and an annular peripheral recess, a clutch in the carrier comprising balls that coöperate with said inclined face, and a spring coiled in said recess of the carrier and tensioned against the opposite inner end of the shell, all arranged so that the peripheral recess in the carrier may be reached through the lateral opening in the shell.

Signed at New York in the county of New York and State of New York this 30th day of October, A. D. 1919.

WILLIAM A. SCHULER.